(12) United States Patent
Matusak

(10) Patent No.: US 8,109,240 B2
(45) Date of Patent: Feb. 7, 2012

(54) PET HARNESSS WITH RESTRAINT

(76) Inventor: Maureen E. Matusak, Morrisville, NC (US)

( * ) Notice: Subject to any disclaimer, the term of this patent is extended or adjusted under 35 U.S.C. 154(b) by 26 days.

(21) Appl. No.: 12/458,158

(22) Filed: Jul. 1, 2009

(65) Prior Publication Data

US 2010/0077967 A1 Apr. 1, 2010

Related U.S. Application Data

(60) Provisional application No. 61/136,773, filed on Oct. 1, 2008.

(51) Int. Cl.
*A01K 15/04* (2006.01)
(52) U.S. Cl. ........................... 119/760; 119/758
(58) Field of Classification Search .................. 119/758, 119/760, 766, 850, 856, 858, 863; 54/79.1, 54/79.4
See application file for complete search history.

(56) References Cited

U.S. PATENT DOCUMENTS

| | | | | |
|---|---|---|---|---|
| 486,483 | A * | 11/1892 | Le Count | 119/758 |
| 1,335,118 | A * | 3/1920 | Link | 119/766 |
| 1,718,062 | A * | 6/1929 | Moore | 119/758 |
| 1,720,628 | A * | 7/1929 | Dawson | 278/120 |
| 3,115,867 | A * | 12/1963 | Meyerotto | 119/758 |
| 4,530,309 | A | 7/1985 | Collins | |
| 5,150,667 | A | 9/1992 | Salidrigas | |
| 5,199,383 | A | 4/1993 | Lagana | |
| 5,660,146 | A | 8/1997 | Sporn | |
| 5,746,158 | A | 5/1998 | Landherr | |
| 5,915,335 | A | 6/1999 | Holt, Jr. | |
| 6,367,424 | B1 * | 4/2002 | Higham | 119/850 |
| 6,422,177 | B1 * | 7/2002 | Noguero | 119/856 |
| 6,637,367 | B1 * | 10/2003 | Dost et al. | 119/28.5 |
| 6,637,377 | B2 * | 10/2003 | Lobanoff et al. | 119/792 |
| 7,140,326 | B2 | 11/2006 | Jenny et al. | |

(Continued)

FOREIGN PATENT DOCUMENTS

| | | |
|---|---|---|
| AU | 2003-255178 | 5/2005 |
| DE | 3837507 | 1/1990 |
| DE | 19844383 | 4/2000 |
| EP | 0694255 | 1/1996 |
| GB | 2302261 | 1/1997 |

OTHER PUBLICATIONS

Website, http://www.moondoggieinc.com/Dog-Harnesses.htm?qclid=Ckmuxv_ qnJUCFOKJxgodS3Ucag, series of dog harnesses, two sheets printed from the internet on Aug. 20, 2008.
Website, http://petsupportsuit.com, pet support suits and dog lift harness, three sheets printed from the internet Aug. 20, 2008.

(Continued)

*Primary Examiner* — Rob Swiatek
*Assistant Examiner* — Lisa Tsang
(74) *Attorney, Agent, or Firm* — Richard C. Litman

(57) ABSTRACT

The pet harness with restraint includes a rigid lateral bar or rod attached across the shoulder strap of a harness. The bar serves to prevent the animal from escaping between the vertical uprights of a fence or similar enclosure. The harness preferably comprises a pair of foreleg loops, a chest strap interconnecting the foreleg loops, and a pair of connecting straps that extend from the loops over the shoulders of the animal. Alternatively, the harness may comprise a collar portion and a body-encircling strap joined by longitudinal chest and dorsal straps. The bar may be permanently attached across the shoulder or dorsal straps of the harness, but is preferably removable to provide a versatile harness. The bar may be attached to the harness by snap fasteners, by insertion into a sleeve attached to the harness, etc. The harness may include elastic sections therein to provide greater adjustment for growing pets.

3 Claims, 9 Drawing Sheets

U.S. PATENT DOCUMENTS

| | | | |
|---|---|---|---|
| 7,284,504 B1 | 10/2007 | Purschwitz, Jr. et al. | |
| 2002/0121248 A1* | 9/2002 | Rooks | 119/856 |
| 2006/0144344 A1 | 7/2006 | Stokes et al. | |
| 2007/0187442 A1 | 8/2007 | Martin et al. | |
| 2008/0022945 A1* | 1/2008 | Hughes et al. | 119/850 |
| 2010/0251972 A1* | 10/2010 | Lady | 119/863 |

OTHER PUBLICATIONS

Website, http://www.seefido.com/html/dog_harness.htm, various dog harnesses, five sheets printed from the internet on Aug. 20, 2008.

Website, http://www.buddy-belts.com/s_45.asp, series of dog_harnesses, five sheets printed from the internet on Sep. 22, 2008.

* cited by examiner

PET HARNESSS WITH RESTRAINT

CROSS-REFERENCE TO RELATED APPLICATION

This application claims the benefit of U.S. Provisional Patent Application Ser. No. 61/136,773, filed Oct. 1, 2008.

BACKGROUND OF THE INVENTION

1. Field of the Invention

The present invention relates generally to tethers for small animals, and particularly to a pet harness with restraint that includes a detachable or permanently attached rigid bar or rod extending laterally across the upper portion of the harness for preventing the pet from escaping through an opening in a fence or the like.

2. Description of the Related Art

Most pet owners are quite concerned for the welfare of their pets. With increasing traffic in most urban and suburban areas, it has become increasingly dangerous to allow a pet to wander from the yard, and in many areas laws have been passed to require pet owners to restrain their pets to their own property.

Yet, in many instances the fencing (if any) is not adequate to restrain a pet within the yard or property. Oftentimes the owner may wish to provide more secure fencing, but local regulations or homeowners' associations do not permit the type of fencing that would adequately restrain the pet, particularly in the case of smaller pets that may be able to escape between the vertical members of a decorative fence.

One solution that has been developed is the installation of a line carrying an electronic signal around the property, and placement of a specialized collar on the pet. The collar includes a sensor to detect the electronic signal and a circuit delivering a shock to the pet when the electronic signal is detected from the line. There are a number of variations on this theme, including proximity sensors that deliver the shock if the animal wanders too far from the signal source, etc. There are several problems with such devices. First of all, they are relatively costly and are not foolproof, since they are ineffective if the collar battery fails. Another important point is that they are one-way devices that only prevent the collared pet from wandering outside the guarded area. They do nothing to prevent another animal from entering the property and possibly harming the pet, and the pet will not be able to escape readily with the system armed.

The present inventor is aware of a number of different harnesses and restraints for pets that have been developed in the past. An example of such is found in German Patent Publication No. 3,837,507 published on Jan. 25, 1990. This reference describes (according to the drawings and English abstract) a pet harness having a chest or breast band and a collar, with the two components joined by a longitudinal chest strap and directly to one another at the shoulders or upper back.

Also, German Patent Publication No. 19,844,383 published on Apr. 6, 2000 describes (according to the drawings and English abstract) a harness surrounding the forward portion of the body of the animal and extending rearwardly to a crupper configuration. The crupper portion carries a container for the collection of feces deposited by the animal.

Thus, a pet harness with restraint solving the aforementioned problems is desired.

SUMMARY OF THE INVENTION

A first series of embodiments of the pet harness with restraint comprises a harness having left and right foreleg loops, a lateral chest strap extending between the foreleg loops, and a connecting strap across the shoulders. A rigid bar or rod is attached to the harness to extend laterally across the shoulders of the animal when the harness is worn. While the bar may be permanently attached to the harness, the bar is preferably removable to facilitate the animal wearing the harness indoors and to allow a wider range of use for the harness, e.g., with a leash for walking the pet. The bar may be attached to the harness in any of a number of ways, e.g., by snaps, by an elastic sleeve installed laterally along the shoulder strap with the bar inserted into the sleeve, etc. The bar may be provided with various means to assure that it does not slip out of the sleeve. The harness may have various closures, and may include elastic portions to provide further adjustment and comfort for growing pets.

A further embodiment of the pet harness with restraint comprises a harness having a collar portion and a body-encircling portion joined by a longitudinal chest strap and a short longitudinal dorsal strap. The restraint bar is attached across the dorsal strap and normal thereto, i.e., extending laterally relative to the orientation of the pet wearing the harness. The restraint bar may be temporarily or permanently attached to the harness as in the case of the first series of embodiments, but is preferably permanently attached.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
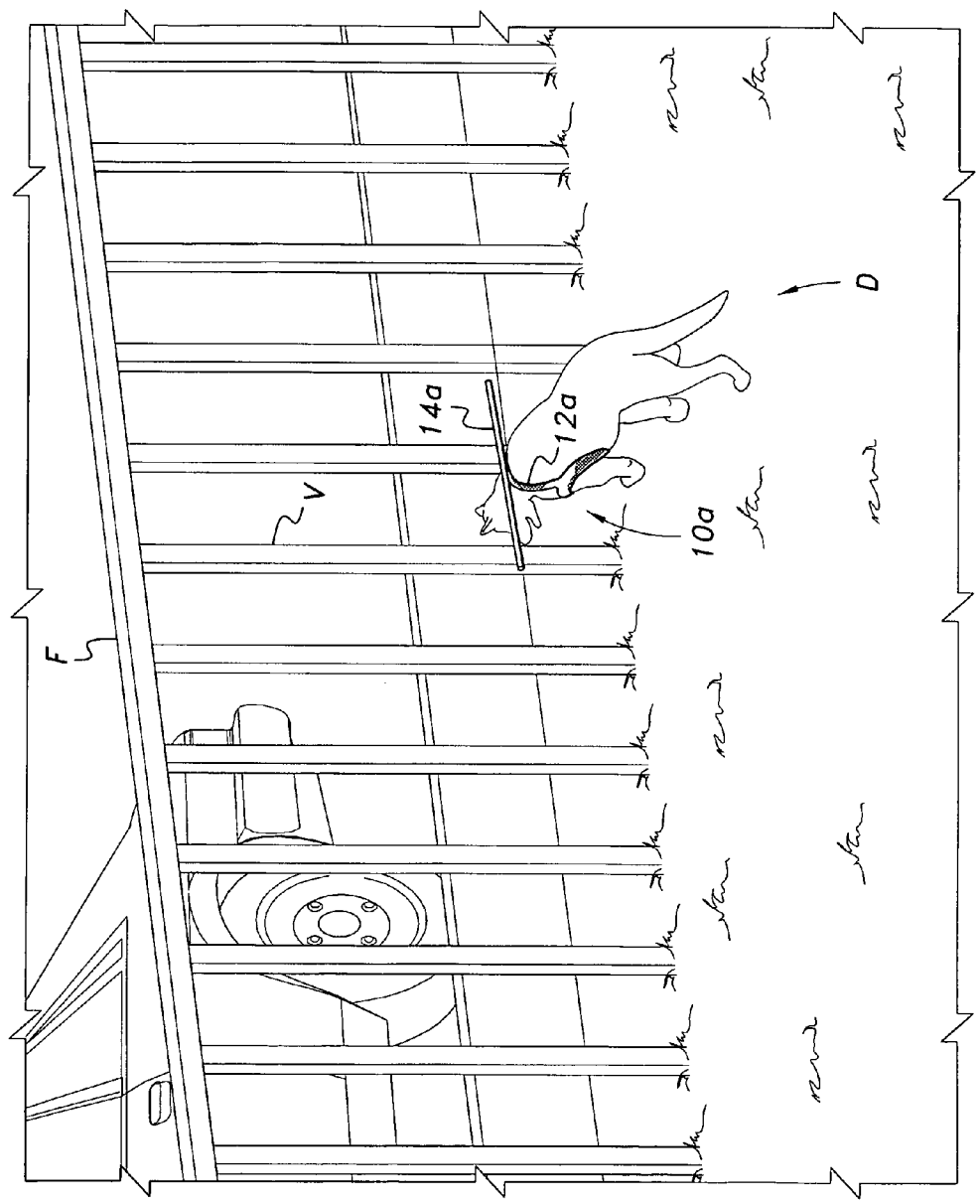
FIG. 1 is an environmental, perspective view of a pet harness with restraint according to the present invention, showing its general features and operation.

The pet harness with restraint has a lateral restraint bar attached thereto for preventing the pet from escaping a fenced yard or from an enclosure having a decorative fence with relatively wide spacing between upright pickets or members. FIG. 1 provides an environmental perspective view of a dog D within an enclosure bound by a fence F, with the dog D wearing a first embodiment 10a of the pet harness and restraint. (The pet harness and restraint in its various embodiments is not limited to use by dogs, but may be worn by cats or other pets as well when scaled for proper size.) The harness 10a comprises a strap assembly 12a, with the elongate, rigid restraint bar 14a disposed laterally across the upper portion of the strap assembly 12a to prevent the dog D or other pet from passing through the spacing between the vertical members V of the fence F.

Figure 2:
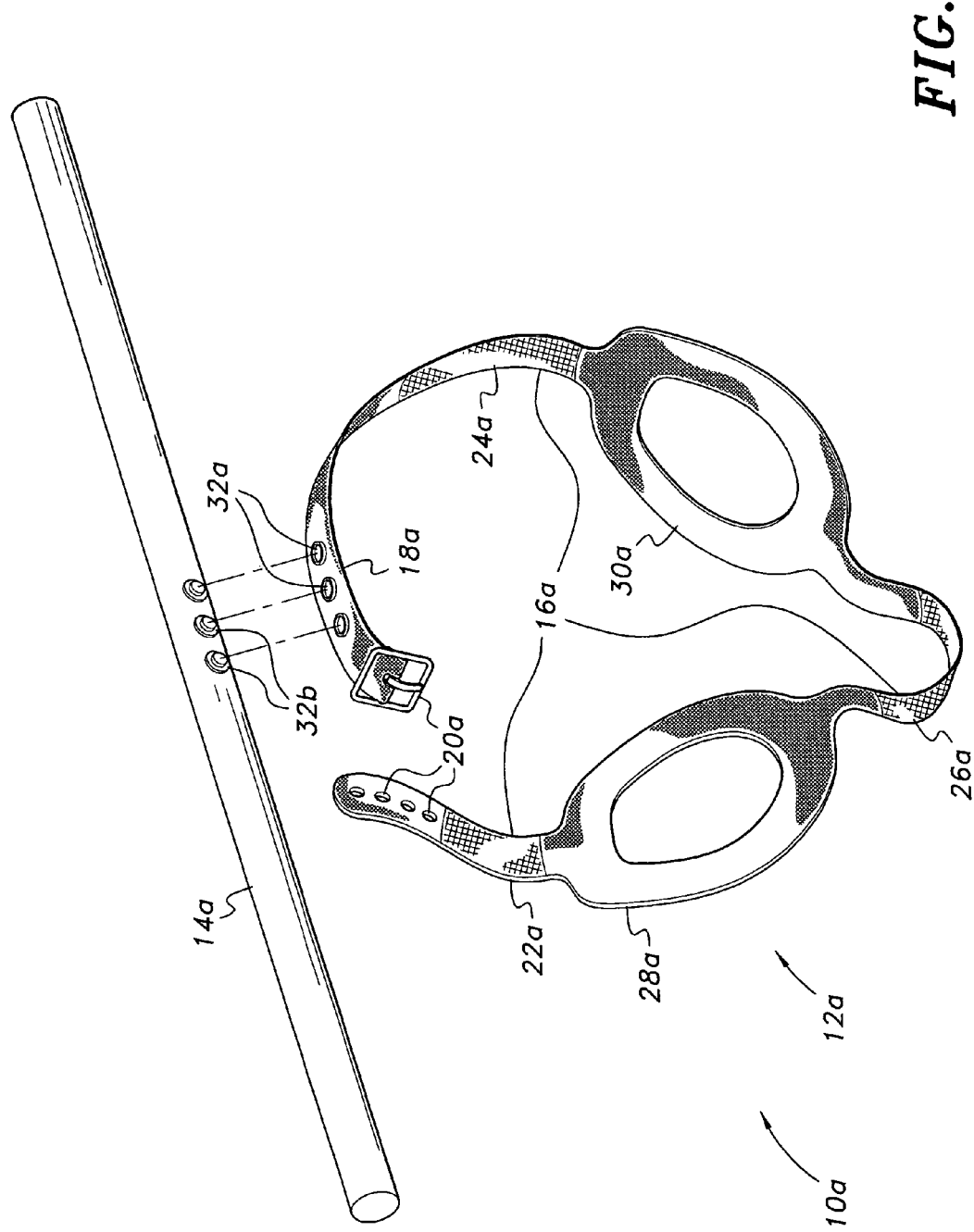
FIG. 2 is an exploded perspective view of a first embodiment of the pet harness, showing removable attachment of the restraint thereto.

FIG. 2 provides an exploded perspective view of the harness and restraint assembly 10a of FIG. 1. The strap assembly 12a comprises a forward body encircling portion 16a with a lateral shoulder portion 18a having a selectively openable closure (e.g., buckle 20a, etc.) thereon, with left and right side portions 22a, 24a and a chest portion 26a. The left and right side portions 22a, 24a and chest portion 26a do not necessarily form a single continuous band, but may include left and right foreleg loops 28a, 30a. The left and right side portions 22a, 24a and chest portion 26a may also comprise elastic segments, if desired.

The lateral shoulder portion 18a of the harness of FIGS. 1 and 2 includes a restraint mount or attachment comprising a plurality of snap fasteners 32a. The central area of the restraint bar 14a has a corresponding plurality of mating snap fasteners 32b. This permits the restraint bar 14a to be removably attached to the lateral shoulder portion 18a of the harness strap assembly 12a as desired, permitting removal for indoor use of the harness, walking the pet on a leash, etc. Preferably at least two heavy-duty snap fastener assemblies 32a, 32b are provided to prevent the bar 14a from rotating relative to the harness. The fasteners 32a, 32b are arranged on the shoulder strap portion 18a of the harness and the bar 14a to hold the bar 14a parallel to the lateral shoulder strap portion 18a, i.e., laterally across the shoulders of the pet when the harness 10a is being worn by the pet, as shown in FIG. 1.

Figure 3:
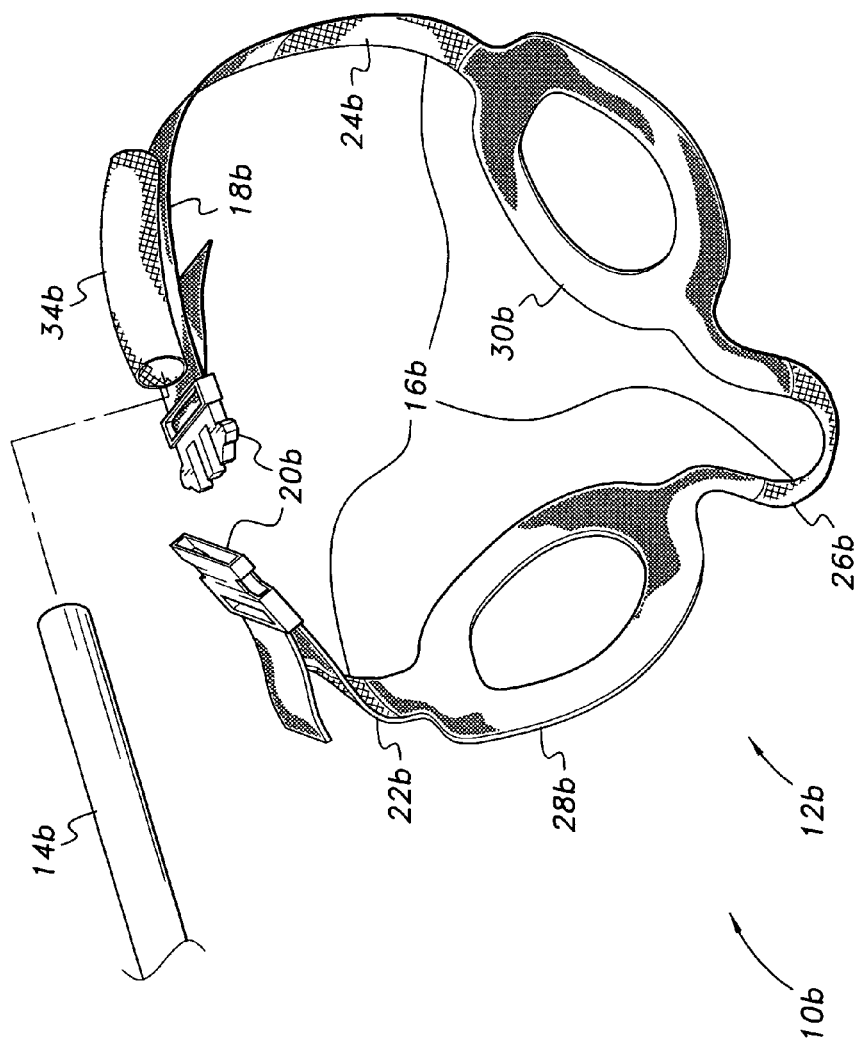
FIG. 3 is an exploded perspective view of a second embodiment of a pet harness with restraint according to the present invention, showing removable attachment of the restraint thereto.

FIG. 3 of the drawings illustrates an alternative embodiment of the pet harness and restraint, designated as harness and restraint 10b. The harness 10b is similar to that illustrated in FIGS. 1 and 2, comprising a strap assembly 12b including a forward body encircling portion 16b with a lateral shoulder portion 18b having a selectively openable closure (e.g., side release latch 20b, etc.) thereon, with left and right side portions 22b, 24b and a chest portion 26b. The left and right side portions 22b, 24b may be separated from the chest strap portion 26b by left and right foreleg loops 28b and 30b, and the portions 22b, 24b, and 26b may be formed of elastic or include elastic inserts, as in the case of the harness strap assembly 12a of FIG. 2.

The harness strap assembly 12b of FIG. 3 includes a restraint mount or attachment comprising an elastic sleeve 34b, which is permanently attached to the laterally disposed shoulder portion 18b of the assembly 12b. The elastic sleeve 34b is parallel to the shoulder strap portion 18b of the assembly, i.e., disposed laterally across the shoulders of the pet or animal wearing the assembly 12b. The sleeve 34b in its relaxed state is of somewhat smaller internal diameter than the external diameter of the restraining bar 14b. Thus, the bar 14b may be inserted through the sleeve 34b to distend the sleeve 34b, with the distended sleeve 34b providing a tight grip of the bar 14b to minimize slippage and departure of the bar 14b from the sleeve 34b. However, the bar 14b may be intentionally removed from the elastic sleeve 34b when desired to permit the harness strap assembly 12b to be used as such without the restraining bar 14b.

Figure 4:
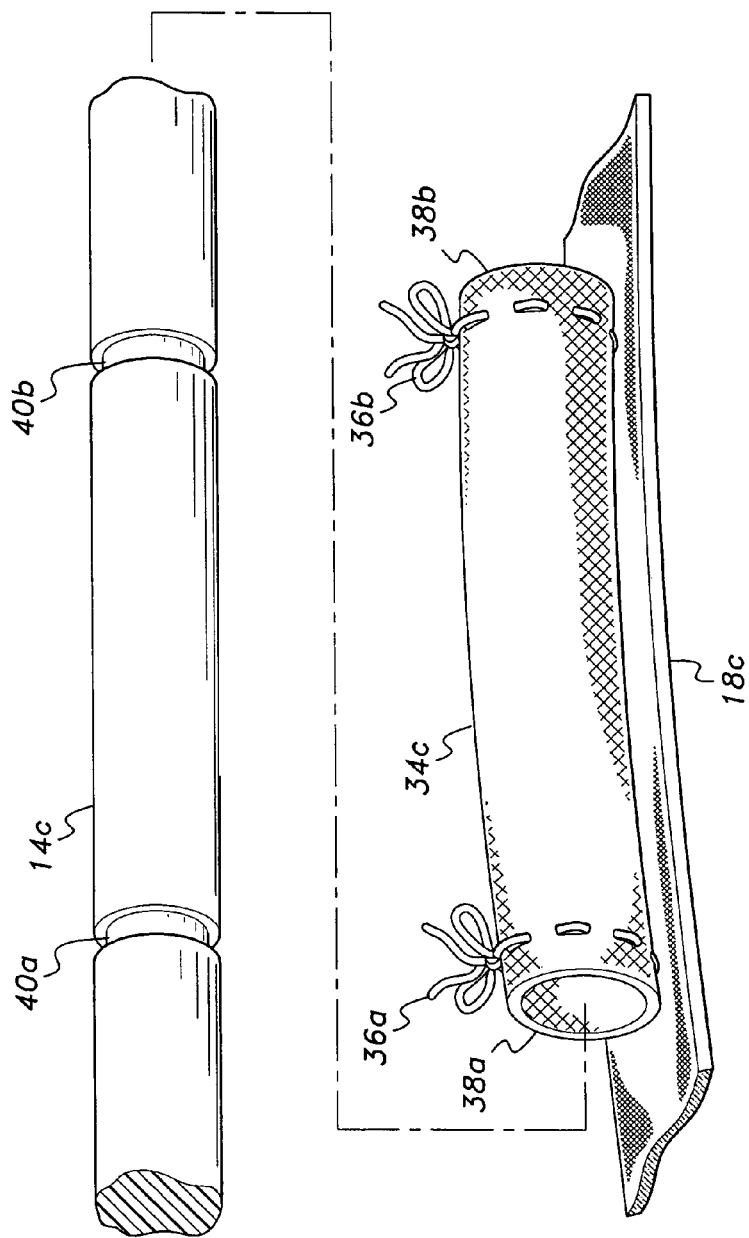
FIG. 4 is a partial exploded perspective view of the attachment portion of a third embodiment of a pet harness with restraint according to the present invention.

FIG. 4 illustrates an alternative embodiment of the restraining bar attachment sleeve of the harness assembly 10b of FIG. 3. The harness strap assembly may be essentially the same as the harness strap assemblies 12a and 12b shown in FIGS. 2 and 3, with the exception being the elastic sleeve 34c. The sleeve 34c differs from the sleeve 34b of the embodiment shown in FIG. 2 by having drawstrings 36a, 36b installed immediately adjacent the respective first and second ends 38a, 38b of the sleeve 34b. The restraint bar 14c is similar to the bar 14b, but includes a pair of spaced apart circumferential grooves 40a and 40b that align with the drawstrings 36a, 36b when the restraint bar 14c is installed within the sleeve 34c. The drawstrings 36a, 36b are tightened within the corresponding grooves 40a, 40b to provide additional security for the bar 14c above that provided by the elastic grip of the sleeve 34c.

Figure 5:
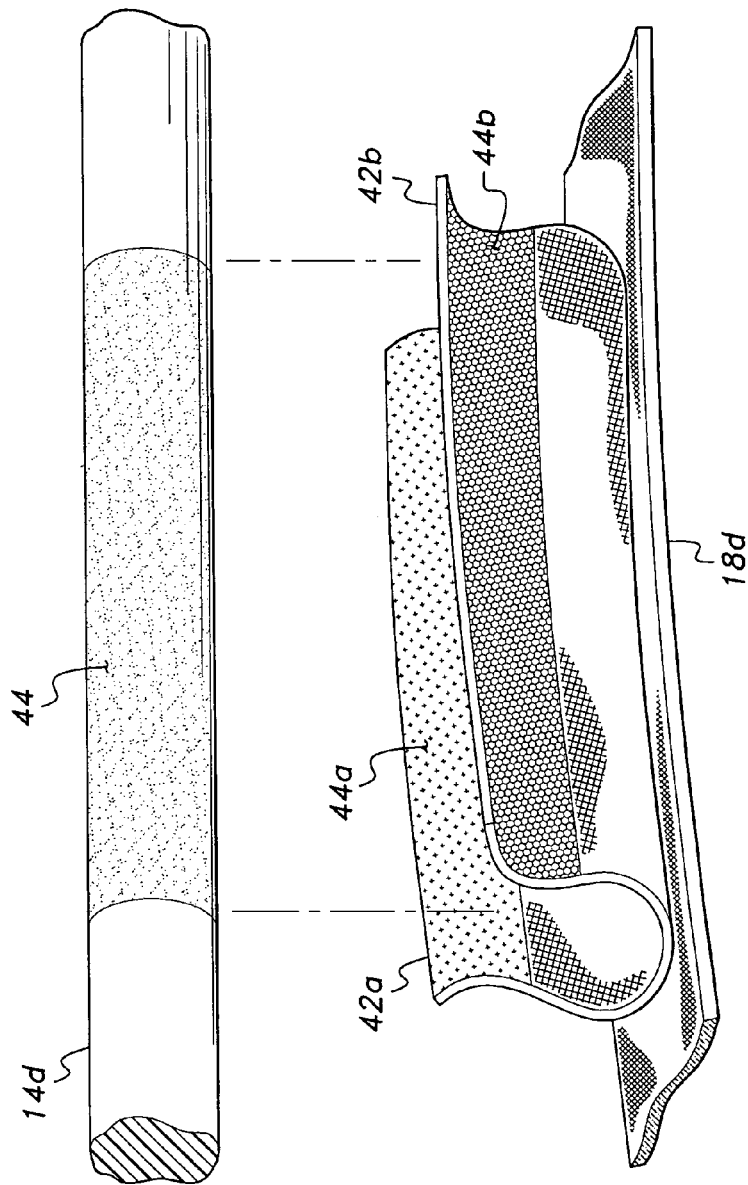
FIG. 5 is a partial exploded perspective view of the attachment portion of a fourth embodiment of a pet harness with restraint according to the present invention.

FIG. 5 of the drawings shows another alternative means of securing the restraint bar to the lateral shoulder strap portion 18d of the harness strap assembly. The shoulder strap 18d of FIG. 5 includes a restraint mount or attachment comprising mutually opposed elongate first and second closure flaps 42a and 42b permanently attached to the strap 18d and extending laterally therealong, i.e., parallel thereto. Each flap 42a, 42b includes hook and loop fabric fastener material thereon, e.g., Velcro®, with the first flap 42a having a first type of material 44a thereon and the second flap 42b having the mating second type of material 44b thereon. The restraint bar 14d may also include such hook and loop fastener material 44 disposed about the central portion thereof to provide greater security for the bar 14d when the flaps 42a, 42b are wrapped therearound and secured to one another to secure the bar 14d to the shoulder strap 18d of the harness assembly. The bar contact surface of e.g. the second flap 42b may be covered with a first type of hook and loop material, with the central portion of the bar 14d being coated with the mating type.

Figure 6:
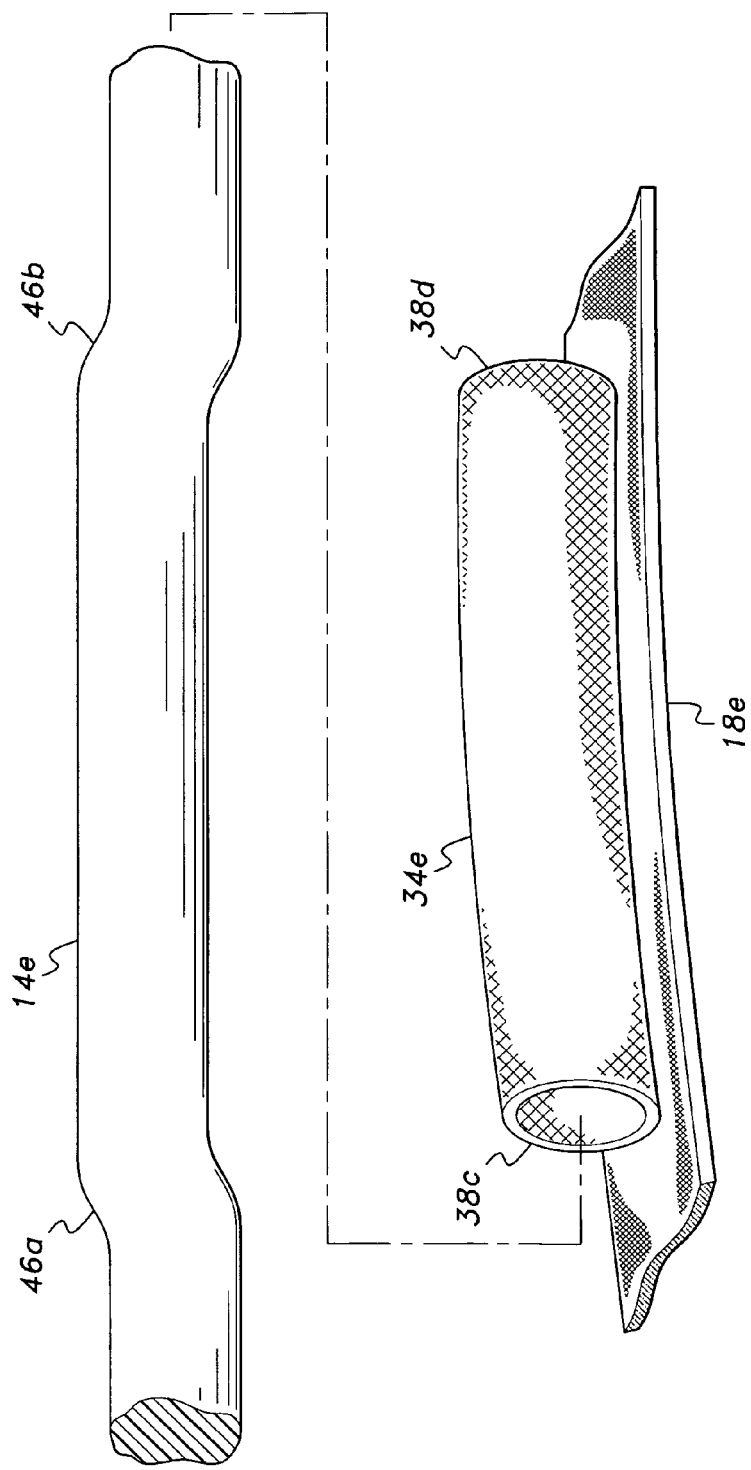
FIG. 6 is a partial exploded perspective view of the attachment portion of a fifth embodiment of a pet harness with restraint according to the present invention.

FIG. 6 is an illustration of yet another embodiment of the transverse restraint bar mount or attachment means, comprising a transverse shoulder strap portion 18e with an elastic sleeve 34e permanently attached thereto. This is essentially like the configuration of the lateral shoulder portion 18b and its elastic sleeve 34b shown in FIG. 2. However, the restraint bar 14e of FIG. 6 differs from that shown in FIG. 2 due to the mutually opposed longitudinal discontinuities comprising first and second offsets 46a, 46b having a spacing therebetween substantially equal to the length of the sleeve 34e. The leading offset produces some resistance as it enters the sleeve 34e when the restraint bar 14e is being installed within the sleeve, but the position of each offset 46a, 46b immediately outside the corresponding end 38c, 38d of the sleeve 34e greatly restricts longitudinal movement of the restraint bar 14e through the sleeve 34e, retaining the bar 14e within the sleeve 34e as desired until the bar 14e is deliberately removed.

Figure 7:
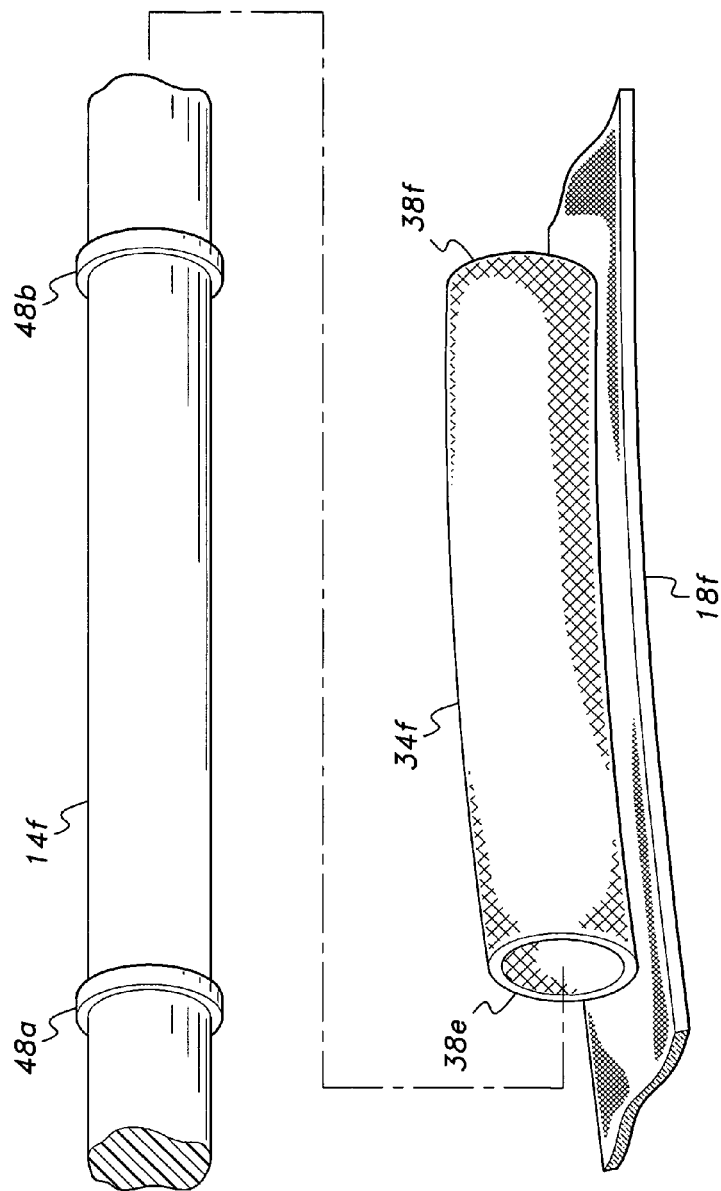
FIG. 7 is a partial exploded perspective view of the attachment portion of a sixth embodiment of a pet harness with restraint according to the present invention.

Still another embodiment of the pet harness is shown in FIG. 7. The lateral shoulder strap portion 18f includes an elastic sleeve 34f permanently attached thereto, in the manner of the strap and sleeve 18b, 34b of FIG. 3 and the strap and sleeve 18e and 34e of FIG. 6. The sleeve length is defined by mutually opposed first and second ends 38e and 38f. The restraining bar 14f includes mutually opposed first and second longitudinal discontinuities comprising annular flanges 48a, 48b, with the flanges 48a, 48b being positioned immediately outside the sleeve ends 38e, 38f when the bar 14f is installed within the sleeve 34b. The two flanges 48a, 48b serve essentially the same function as the offsets 46a, 46b of the restraining bar 14e of FIG. 6, i.e., to hold the center of the bar 14f in place within the sleeve 34f. As in the case of the leading offset of the bar 14e in FIG. 6, the leading flange of the bar 14f of FIG. 7 will meet with some resistance as it is pushed into the elastic sleeve 34f. However, the two flanges 48a, 48b resist accidental passage through the sleeve 34f, thereby retaining the center of the restraint bar 14f within the sleeve 34f and precluding its accidental departure from the sleeve 34f.

Figure 8:
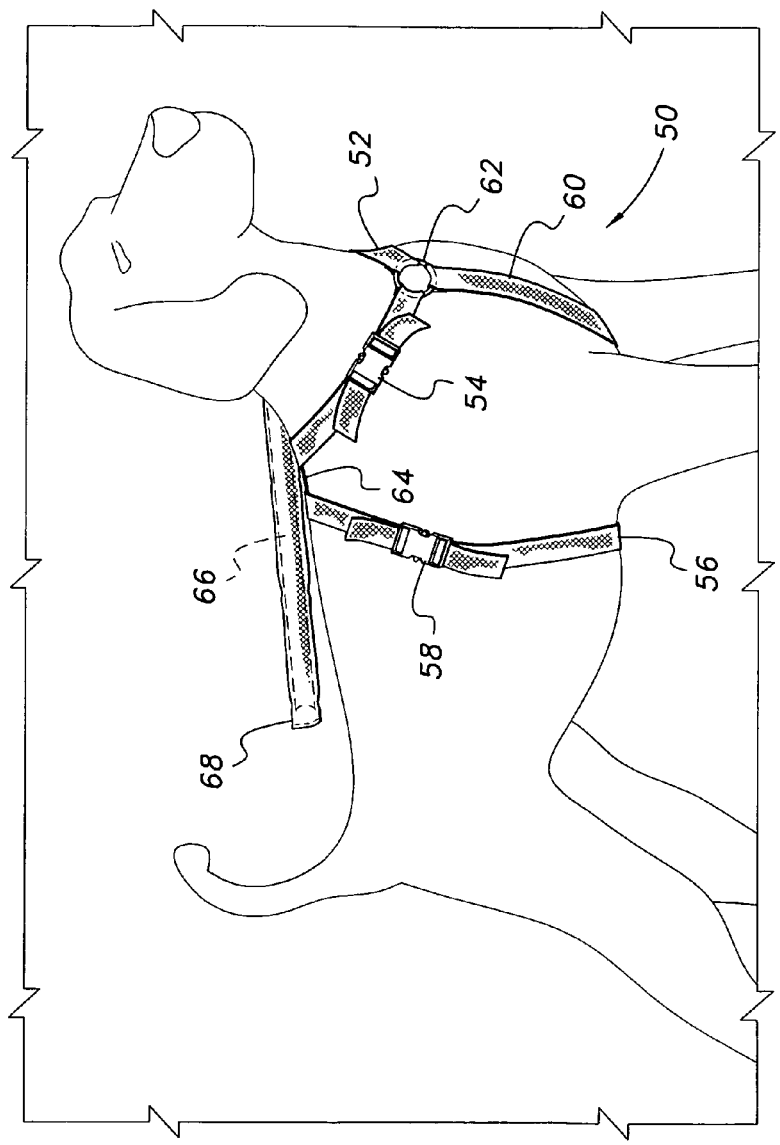
FIG. 8 is an environmental perspective view of another embodiment of a pet harness with restraint according to the present invention, having a different harness configuration than that shown in FIGS. 1 and 2.
Figure 9:
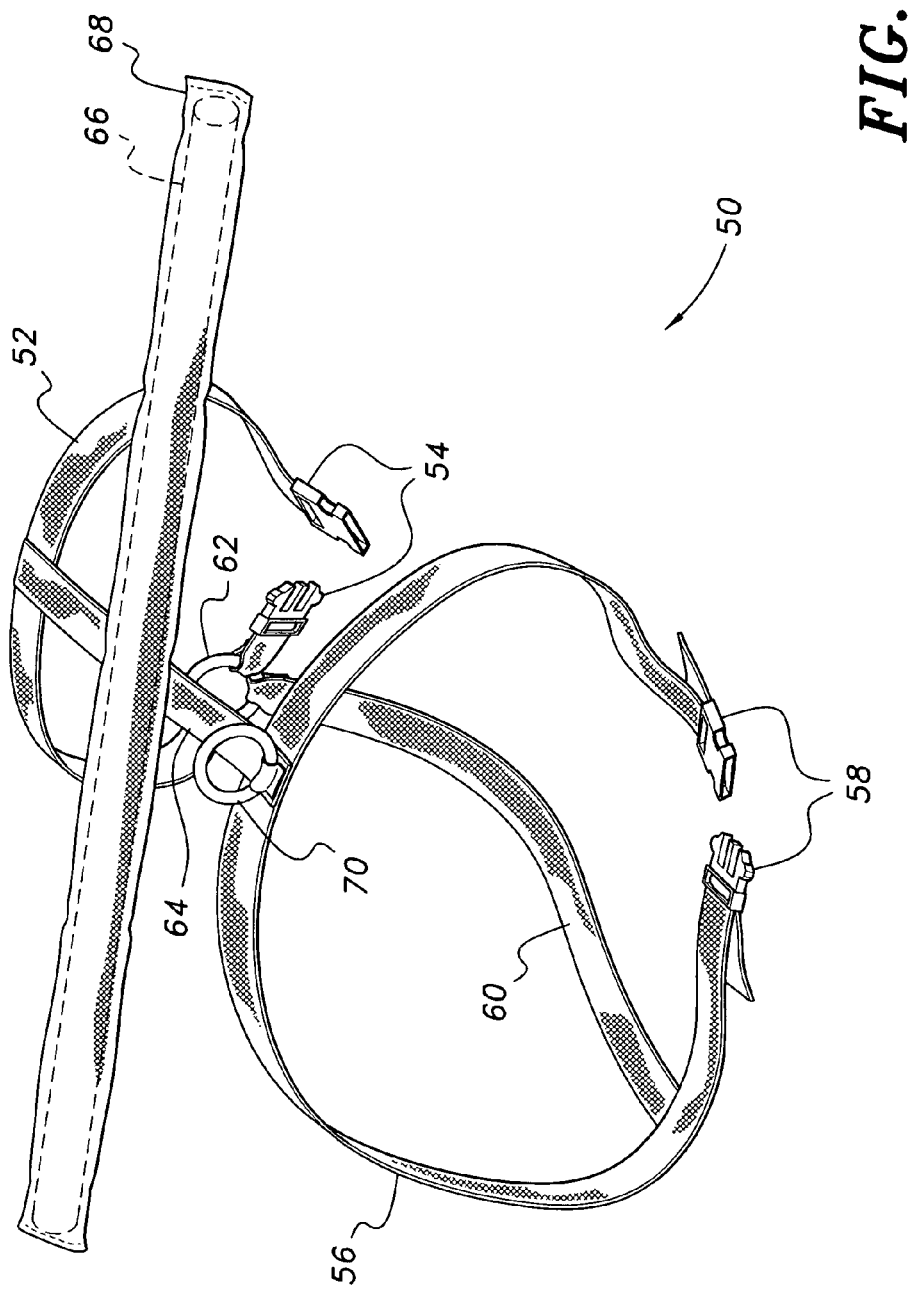
FIG. 9 is a detailed perspective view of the pet harness with restraint of FIG. 8, showing further details thereof.

FIGS. 8 and 9 illustrate still another embodiment of the pet harness with restraint, wherein the harness has a different configuration than that of FIGS. 1 through 3. The harness 50 of FIGS. 8 and 9 includes a collar portion 52 having an adjustable closure 54 (e.g., side latch buckle as shown or, alternatively, a conventional belt-type buckle, hook and loop fabric closure, etc.). A torso or body-encircling strap 56 having an adjustable closure 58 is located behind the collar 52. A generally longitudinal chest strap 60 has a forward end attached to the collar portion 52 by a ring 62 or other suitable attachment means, and an opposite rearward end suitably attached (e.g., stitched, riveted, etc.) to the body-encircling strap 56 of the harness 50, as shown in FIG. 9. Length adjustment means (not shown) may be provided for the longitudinal chest strap 60. The opposite upper portions of the collar portion 52 and body-encircling strap 56 are joined (e.g., stitched, riveted, etc.) by a relatively short, longitudinally oriented dorsal strap 64 extending between the collar 52 and the body-encircling strap 56 and positioned approximately between the shoulders of the animal when the harness 50 is being worn.

An elongate, rigid restraint bar 66 is attached to and extends laterally across the longitudinal dorsal strap 64 and generally normal thereto, as indicated in FIGS. 8 and 9. The restraint bar 66 and its means of attachment or mounting to the harness 50 may comprise any of the means of bar attachment or mounting illustrated in FIGS. 1 through 7 of the drawings and discussed further above. In the example illustrated in FIGS. 8 and 9, a closed sleeve 68 of fabric or other suitable material is permanently attached (e.g., stitched, etc.) across the dorsal strap 64, with the restraint bar 66 being sewn or otherwise secured within the sleeve 68. The function and operation of the pet harness 50 with its restraint 66 is essentially the same as described further above for the other embodiments.

In conclusion, the various embodiments of the pet harness with restraint bar provide a versatile and economical solution to the problem of restraining a pet within a fence or the like that the pet might otherwise work its way through to escape the yard or enclosure. The harness strap assembly may be provided with a conventional attachment ring 70 or the like (e.g., as shown in FIG. 9 of the drawings) for removably attaching a leash or the like thereto to permit the owner to walk the pet conventionally when the bar is removed. Thus, the pet harness and its removable restraint bar provide excellent versatility for the pet owner, permitting the pet to roam the fenced yard or enclosure without supervision when the restraint bar is installed therein. Yet, pet may roam unencumbered within the interior of the home or other structure without risking damage to articles within the home, when the bar is removed.

It is to be understood that the present invention is not limited to the embodiments described above, but encompasses any and all embodiments within the scope of the following claims.

I claim:

1. A pet harness with restraint adapted to be placed upon a pet wherein the pet possesses an elongated body and at least left and right forelegs, comprising:
   a strap assembly consisting of a unitary, one-piece continuous, monolithic forward body-encircling portion defining curvilinear left and right foreleg loops connected by a chest portion and terminating in lateral shoulder portions having a selectively operable closure;
   a restraint mount disposed upon one of the lateral shoulder portions; and
   an elongate, rigid restraint bar attached to the restraint mount, the bar extending laterally across the strap assembly and being substantially aligned with the lateral shoulder portions of the strap assembly.

2. The pet harness with restraint according to claim 1, wherein the restraint bar is removably attached to the restraint mount.

3. The pet harness with restraint according to claim 1, wherein:
   the restraint mount comprises at least one snap fastener; and
   the restraint bar has at least one snap fastener removably attachable to the snap fastener of the restraint mount.

* * * * *